(12) United States Patent
Govande et al.

(10) Patent No.: US 11,445,012 B2
(45) Date of Patent: Sep. 13, 2022

(54) PROACTIVE LOAD BALANCER FOR DATA STORAGE SYSTEM

(71) Applicant: Seagate Technology LLC, Fremont, CA (US)

(72) Inventors: Nilesh Govande, Pune (IN); Basavaraj Kirunge, Pune (IN)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 6 days.

(21) Appl. No.: 17/105,162

(22) Filed: Nov. 25, 2020

(65) Prior Publication Data

US 2022/0166828 A1    May 26, 2022

(51) Int. Cl.
*H04L 67/1029*    (2022.01)
*H04L 67/1097*    (2022.01)
(Continued)

(52) U.S. Cl.
CPC ...... *H04L 67/1029* (2013.01); *G06F 11/3006* (2013.01); *G06F 11/3433* (2013.01); *H04L 67/1008* (2013.01); *H04L 67/1097* (2013.01)

(58) Field of Classification Search
CPC ....... H04L 1/0057; H04L 61/10; H04L 61/20; H04L 63/0428; H04L 63/08; H04L 63/104; H04L 63/108; H04L 67/28; H04L 9/0863; H04L 9/0894; H04L 9/3226; H04L 47/125; H04L 49/901; H04L 67/1002; H04L 67/025; H04L 67/1004; H04L 67/1008; H04L 67/1014; H04L 67/1025; H04L 67/1031; H04L 67/1036; H04L 67/1095; H04L 41/0668; H04L 67/1012; H04L 67/1019; H04L 67/1029; H04L 29/08; H04L 29/08072; H04L 61/1511; H04L 67/327; H04L 67/34; H04L 69/329; H04L 67/02; H04L 65/1069; H04L 65/1104; H04L 9/3247; H04L 65/1013; H04L 65/1045; H04L 65/1101; H04L 9/0643; H04L 41/5025; H04L 43/08; H04L 67/1001; H04L 43/0811; H04L 67/10; H04L 41/0896; H04L 41/5096; H04L 41/147; H04L 43/0829; H04L 43/0852;
(Continued)

(56) References Cited

U.S. PATENT DOCUMENTS 8,218,553 B2    7/2012  Kompella
9,531,590 B2    12/2016 Jain et al.
(Continued)

*Primary Examiner* — Djenane M Bayard
(74) *Attorney, Agent, or Firm* — Holzer Patel Drennan

(57) ABSTRACT

Load balancing technology is used to distribute tasks requested of a data storage network across the connected storage nodes within the data storage network. Conventional load balancing technology is not proactive. Storage nodes within a data storage network may have different performance characteristics and/or current loads created by various demands on the storage nodes and connected servers. The proactive load balancers and corresponding load balancer agents disclosed herein are used to detect these variations in performance characteristics and/or current loads in the storage nodes and connected servers to inform decisions made by the proactive load balancer in distributing incoming access requests across the storage nodes and connected servers.

17 Claims, 4 Drawing Sheets

(51) Int. Cl.
*H04L 67/1008* (2022.01)
*G06F 11/30* (2006.01)
*G06F 11/34* (2006.01)

(58) Field of Classification Search
CPC ............... H04L 43/087; H04L 43/0882; H04L 67/1097; H04L 1/0002; H04L 1/0009; H04L 1/0041; H04L 1/18; H04L 1/1874; H04L 41/0213; H04L 41/0604; H04L 41/0893; H04L 41/22; H04L 41/5009; H04L 43/045; H04L 43/06; H04L 43/0817
See application file for complete search history.

(56) References Cited

U.S. PATENT DOCUMENTS

| | | | |
|---|---|---|---|
| 9,703,584 B2 | 7/2017 | Kottomtharayil et al. | |
| 10,320,679 B2 | 7/2019 | Jain et al. | |
| 2005/0114480 A1* | 5/2005 | Ramamoorthy | H04L 67/1002 709/220 |
| 2011/0276695 A1* | 11/2011 | Maldaner | H04L 41/00 709/226 |
| 2014/0122698 A1* | 5/2014 | Batrouni | H04L 41/0896 709/224 |
| 2014/0379901 A1* | 12/2014 | Tseitlin | H04L 41/5096 709/224 |
| 2016/0094451 A1* | 3/2016 | Jain | H04L 67/1029 709/241 |
| 2020/0007405 A1 | 1/2020 | Chitalia et al. | |

\* cited by examiner

PROACTIVE LOAD BALANCER FOR DATA STORAGE SYSTEM

BACKGROUND

Growing use of cloud-based storage solutions has driven demand for low-cost data storage systems capable of retaining large volumes of data. Various implementations of these cloud-based storage solutions may utilize combinations of storage nodes, each of which includes an array of servers and associated data storage devices (e.g., hard disc drives (HDDs) and/or solid-state drives (SSDs)). Load balancing technology is used to distribute tasks requested of a data storage network across the connected storage nodes within the data storage network. Conventional load balancing technology may route requested tasks evenly across connected storage nodes. Some conventional load balancing technology reactively redistributes the load after noting slow response times. However, this necessarily occurs only after a slow-down in performance is detected and is thus not proactive.

SUMMARY

Implementations described and claimed herein address the foregoing problems by providing a data storage system comprising a first node, a second node, and a proactive load balancer. The first node includes one or more servers, each connected to a data storage resource, and a first load-balancing agent. The second node includes one or more servers, each connected to a data storage resource, and a second load-balancing agent. The proactive load balancer is to receive a first node performance metric from the first load-balancing agent and a second node performance metric from the second load-balancing agent. The proactive load balancer is further to direct an incoming access request to the data storage system to one or more of the servers connected to the first node and the second node based on the first node performance metric and the second node performance metric.

Implementations described and claimed herein address the foregoing problems by further providing a method of operating a proactive load balancer within a data storage network. The method comprises sending a current load query from the proactive load balancer to a first node and a second node. The first node includes one or more servers, each connected to a data storage resource, and a first load-balancing agent. The second node includes one or more servers, each connected to a data storage resource, and a second load-balancing agent. The method further comprises receiving a response from the first load-balancing agent including a first node performance metric and from the second load-balancing agent including a second node performance metric, receiving an access request from a client at the proactive load balancer for the data storage network, and directing the access request to one or more of the servers connected to the first node and the second node based on the received first node performance metric and the second node performance metric.

Other implementations are also described and recited herein.

BRIEF DESCRIPTIONS OF THE DRAWINGS

DETAILED DESCRIPTIONS

Storage nodes within a data storage network may have different performance characteristics and/or current load created by various demands on the storage nodes. The proactive load balancers and corresponding load balancer agents disclosed herein are used to detect these variations in performance characteristics and/or current load in the connected storage nodes to inform decisions made by the proactive load balancer in distributing incoming access requests across the storage nodes. This may be contrasted with conventional load balancers that are reactive and do not take into consideration the access requests themselves, nor the current load on connected nodes and/or servers.

Figure 1:
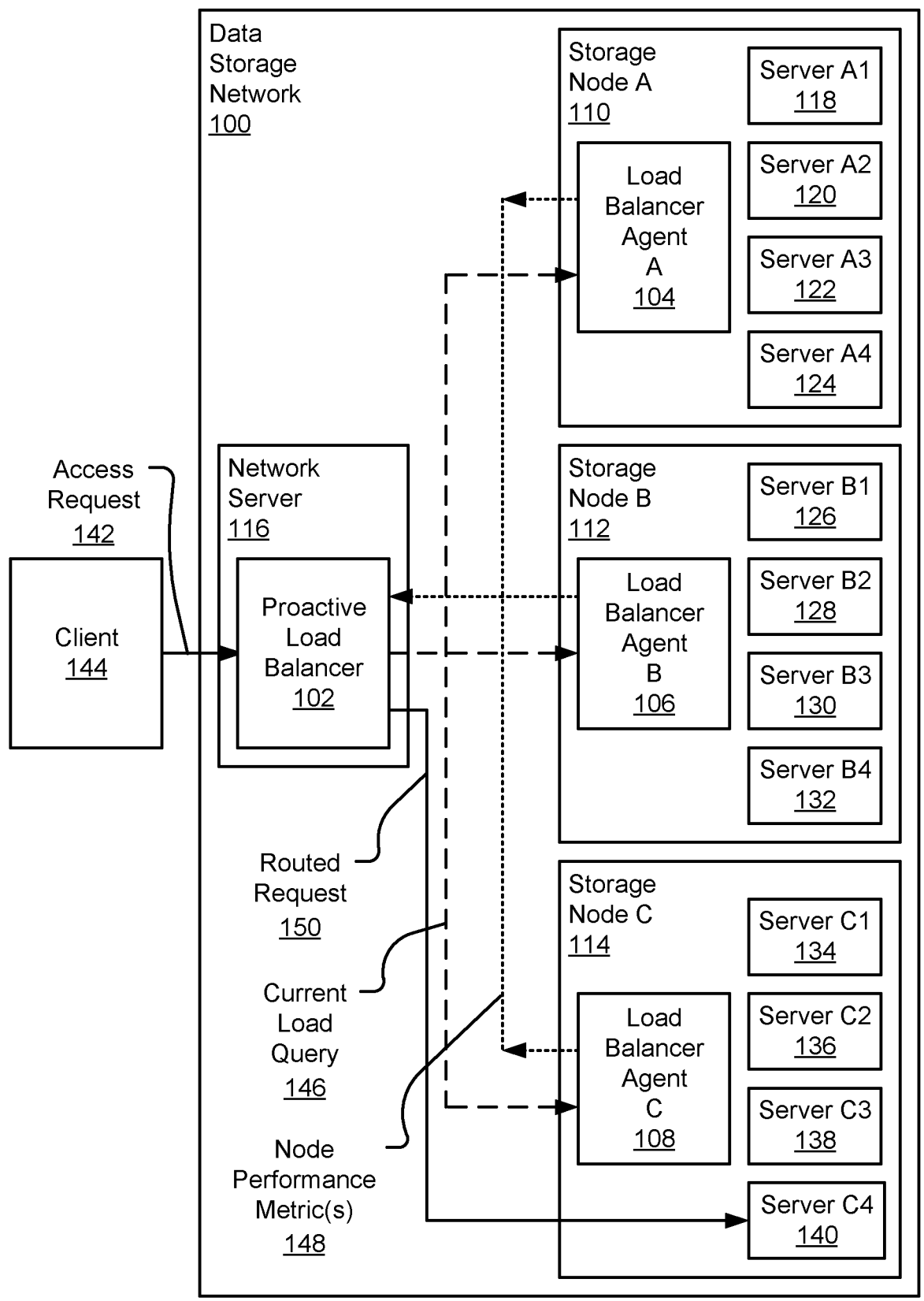
FIG. 1 illustrates an example data storage network system diagram including a proactive load balancer and load balancer agents installed on storage nodes within the data storage network.

FIG. 1 illustrates an example data storage network 100 system diagram including a proactive load balancer 102 and load balancer agents 104, 106, 108 installed on storage nodes 110, 112, 114, respectively, within the data storage network 100. The data storage network 100 may be a local area network (LAN) or a wide area network (WAN), or a combination thereof that is managed by a network server 116. The network server 116 manages access to the data storage network 100, which may include an array of storage nodes (here, illustrated as storage node A 110, storage node B 112, and storage node C 114).

In various implementations, the storage nodes 110, 112, 114 are physical collections of data storage hardware (e.g., servers or storage arrays) within the data storage network 100, or logical divisions of available storage resources within the data storage network 100. The number of storage nodes may vary from one to many, and storage nodes may be connected to and disconnected from the data storage network 100 over time. The network server 116 may also manage access to other network devices (e.g., user terminals, not shown). In some implementations, the network server 116 may also permit data access between the storage nodes 110, 112, 114. In general, the network server 116 manages external requests for access to the storage nodes 110, 112, 114, for example, access request 142 by client 144.

The proactive load balancer 102 is an application (or set of applications) running on the network server 116 that distributes incoming access requests across the storage nodes 110, 112, 114 in order to optimize overall operation of the data storage network 100. The proactive load balancer 102 is illustrated conceptually as software running on the network server 116 in FIG. 1. The load balancer agents 104, 106, 108 running on storage nodes 110, 112, 114, respectively, collect performance and/or current load information regarding each server assigned within each respective node, and report the performance and/or current load information (also referred to herein as performance metrics) back to the proactive load balancer 102 to inform subsequent decisions regarding distribution of subsequent incoming access requests. In various implementations, the performance and/or availability information is reported back in the form of a current load metric specific to each server connected to a node, which is compared against current load metrics calculated for the servers connected to the same or other nodes to determine routing for subsequent incoming access requests to the data storage network 100.

Specifically, load balancer agent A 104 is running on storage node A 110 (e.g., as software running on a server dedicated to storage node A 110). The storage node A 110 includes servers A1 118, A2 120, A3 122, and A4 124. Each of the servers 118, 120, 122, 124 include at least one processor with connected (in some cases, dedicated) storage capacity (e.g., data storage drives, not shown). The load balancer agent A 104 queries each of the servers 118, 120, 122, 124 for current load metrics, compiles the received metrics, and reports the compiled metric (also referred to herein as a node performance metric) back to the proactive load balancer 102 for storage node A 110.

Similarly, load balancer agent B 106 is running on storage node B 112 (e.g., as software running on a server dedicated to storage node B 112). The storage node B 112 includes servers B1 126, B2 128, B3 130, and B4 132. Each of the servers 126, 128, 130, 132 include at least one processor with connected (in some cases, dedicated) storage capacity (e.g., data storage drives, not shown). The load balancer agent B 106 queries each of the servers 126, 128, 130, 132 for current load metrics, compiles the received metrics, and reports the compiled metric back to the proactive load balancer 102 for storage node B 112.

Also similarly, load balancer agent C 108 is running on storage node C 114 (e.g., as software running on a server dedicated to storage node C 114). The storage node C 114 includes servers C1 134, C2 136, C3 138, and C4 140. Each of the servers 134, 136, 138, 140 include at least one processor with connected (in some cases, dedicated) storage capacity (e.g., data storage drives, not shown). The load balancer agent C 108 queries each of the servers 134, 136, 138, 140 for current load metrics, compiles the received metrics, and reports the compiled metric back to the proactive load balancer 102 for storage node C 114.

In an example implementation, the client 144, which may be any external device attempting access to the data storage network 100 sends the access request 142 to the data storage network 100. The access request 142 may be a read request, a write request, or an administrative request (e.g., a user addition, user deletion, or use rights change request), for example. Other types of access requests are contemplated herein.

The access request 142 is received by the proactive load balancer 102, which in response, directs a current load query 146 to the storage nodes 110, 112, 114. The current load query 146 is received at the load balancer agents 104, 106, 108 running on each of the storage nodes 110, 112, 114, respectively. The load balancer agents 104, 106, 108 query their connected servers for current load metrics and compiles the received metrics into a node performance metric. The load balancer agents 104, 106, 108 then reports compiled node performance metric(s) 148 back to the proactive load balancer 102. Then, the proactive load balancer 102 routes the access request 142 to the storage node and server connected thereto with a low (below a threshold) or the lowest current load to execute the request, here illustrated as storage node C 114 and server C4 140 (see routed request 150).

In other implementations, the proactive load balancer 102 directs the current load query 146 to the storage nodes 110, 112, 114 on a periodic basis rather than in response to the access request 142. Accordingly, the routed request 150 will not wait for a response to the current load query 46 and will instead be directed based on the last received periodic update of the current load on the storage nodes 110, 112, 114 and their respective servers. Further, in other implementations, the current load metrics for each of the servers within a node may be compiled at the proactive load balancer 102 rather than at the load balancer agents 104, 106, 108. In this implementation, the node performance metrics 148 is a collection of current load metrics for each of the servers 118, 120, 122, 124, 126, 128, 130, 132, 134, 136, 138, 140 and not compiled or organized by storage node until collected by the proactive load balancer 102. In various implementations, calculation of current load metrics for each of the storage nodes 110, 112, 114 may vary based on the type of the access request 142 (e.g., read, write, or administrative).

While three storage nodes (storage nodes 110, 112, 114) and 12 servers 118, 120, 122, 124, 126, 128, 130, 132, 134, 136, 138, 140 are illustrated in FIG. 1, any number of storage nodes, each having any number of servers is contemplated herein. Further, the number of servers grouped within a node may vary within the data storage network 100. Also, the data storage network 100 may apply any available storage structure (e.g., file storage or object storage).

In various implementations, the proactive load balancer 102 and/or the load balancer agents 104, 106, 108 come pre-installed within commercially available hardware but remain dormant until and unless the hardware is connected to the data storage network 100 and configured as shown in FIG. 1, for example, and described above. In other implementations, upon connection to the storage network 100, the proactive load balancer 102 installs the load balancer agents 104, 106, 108 on the storage nodes 110, 112, 114 (and other storage nodes as they are connected to the data storage network 100), with or without input or authorization from a user.

Figure 2:
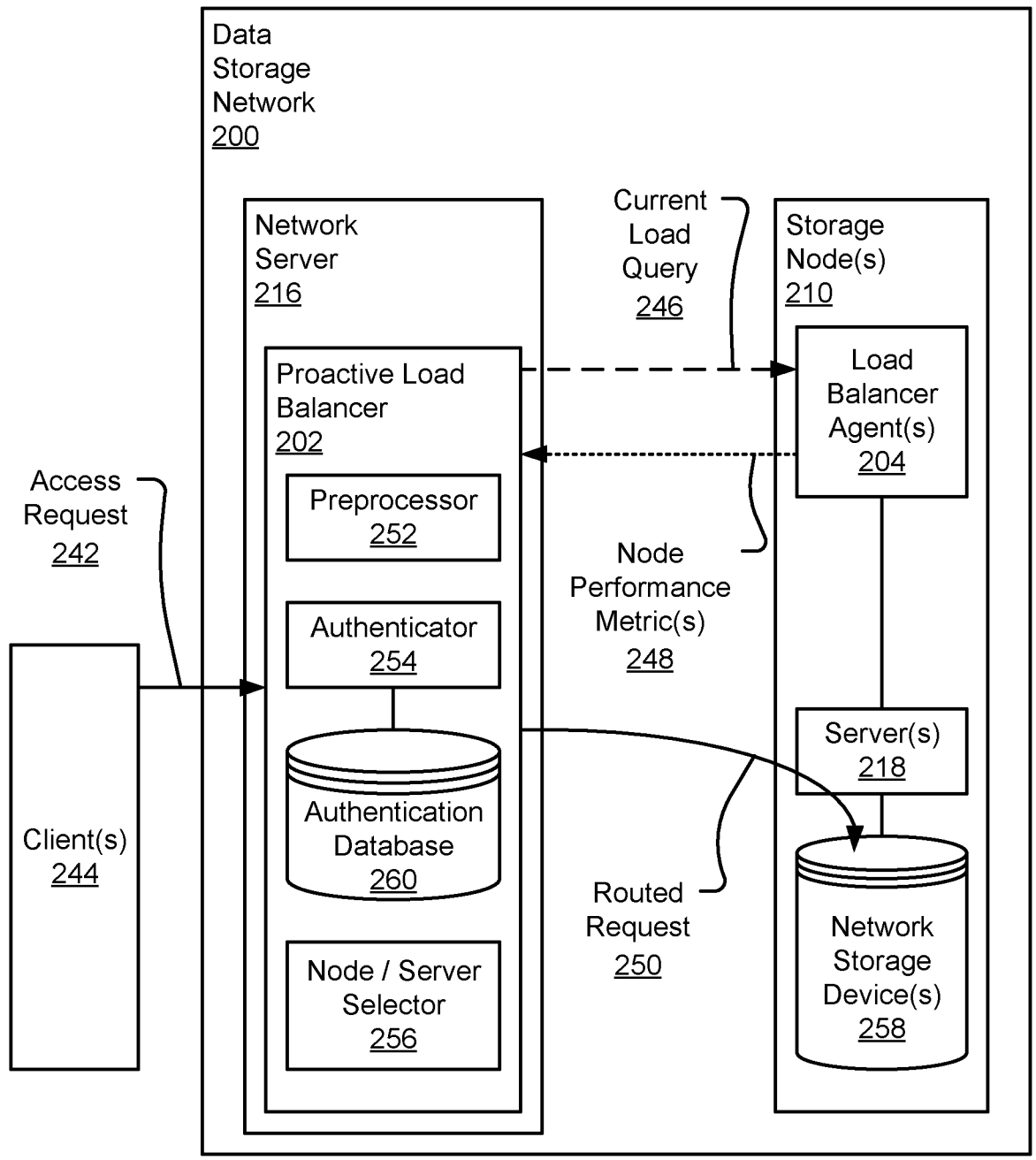
FIG. 2 illustrates an example data storage network system diagram including a proactive load balancer including preprocessor, authenticator, and node/server selector modules.

FIG. 2 illustrates an example data storage network 200 system diagram including a proactive load balancer 202 including preprocessor 252, authenticator 254, and node/server selector 256 modules. The data storage network 200 may be a LAN, WAN, or a combination thereof that is managed by a network server 216. The data storage network 200 includes an array of storage nodes 210 that are physical collections of data storage hardware within the data storage network 200, or logical divisions of available storage resources within the data storage network 200. The number of storage nodes may vary from one to many, and storage nodes may be connected to and disconnected from the data storage network 200 over time. The network server 216 may also manage access to other network devices as well. In some implementations, the network server 216 may also permit data access between the storage nodes 210. In general, the network server 216 manages external requests for access to the storage nodes 210, for example, access request 242 by client 244.

The proactive load balancer 202 is an application (or set of applications) running on the network server 216 that distributes incoming access requests across the storage nodes 210 in order to optimize overall operation of the data storage network 200. The proactive load balancer 202 is illustrated conceptually as software running on the network server 216 in FIG. 2. Load balancer agent(s) 204 are running on the storage node(s) 210 and collect performance and/or current load information regarding server(s) 218 assigned to each respective node and report the performance and/or current load information (also referred to herein as performance metrics) back to the proactive load balancer 202 to inform subsequent decisions regarding distribution of subsequent incoming requests. The server(s) 218 may each have one or more connected network storage devices 258 (e.g., SSDs or HDDs).

In various implementations, the performance and/or availability information is reported back in the form of a current load metric (discussed in further detail below below) specific to each of the server(s) 218/storage node(s) 210 combination. The proactive load balancer 202 compares the received current load metrics to determine routing for subsequent incoming access requests to the data storage network 200. In an example implementation, the client 244, which may be any external device attempting access to the data storage network 200 sends the access request 242 to the data storage network 200. The access request 242 may be a read request, a write request, or an administrative request, for example. The access request 242 is received by the proactive load balancer 202, which in response, may perform one or more of the following actions.

The preprocessor 252 performs preprocessing that would conventionally be performed at the storage node(s) 210 and/or the server(s) 218. In various implementations, the preprocessor 252 may check whether the access request 242 is in the proper form and format and whether it is a valid request (e.g., it may perform a header validation and/or a time sync on the access request 242). The preprocessor 252 may also reformat the access request 242 for execution within the data storage network 200 (e.g., it may perform a secure socket layer (SSL) termination). The authenticator 254 authenticates the client(s) 244 has having the appropriate permissions to direct the access request 242. An authentication database 260 includes assigned and authorized permissions for each registered client (or user) of the data storage network 200. Authentication information provided by the client(s) 244 (or associated user(s)) is included with the access request 242 and the authenticator 254 compares the authentication information provided by the client(s) 244 against the information within the authentication database 260 and makes a determination as to whether the access request 242 is permitted.

In various implementations, presence of the preprocessor 252, the authenticator 254, and/or the authentication database 260 adds additional hardware features or capability to the network server 216, such as processor(s) or processing bandwidth and data storage capacity. By moving some or all of the preprocessing and/or authentication steps away from the storage node(s) 210 and/or the server(s) 218 to the proactive load balancer 202, overall traffic within the data storage network 200 may be reduced by eliminating queries and responses between the network server 216, storage node(s) 210, and/or the server(s) 218 specific to preprocessing the access request 242 and/or authenticating the client(s) 244. Further, by moving the authentication database 260 to the proactive load balancer 202, similar and redundant data may be omitted from the storage node(s) 210 and/or the server(s) 218, thereby reducing demand on the network storage device(s) 258 to store the authentication database 260. In some implementations, the preprocessor 252, the authenticator 254, and/or the authentication database 260 and their respective functions are omitted from the proactive load balancer 202.

The proactive load balancer 202 may further direct a current load query 246 to the storage node(s) 210. The current load query 246 is received at the load balancer agent(s) 204 running on each of the storage node(s) 210. The load balancer agent(s) 204 each query connected server(s) 218 for current load metrics. The current load metrics include any measurable metric of overall performance capability and current usage or load on a server, including for example, central processing unit (CPU) capacity and/or usage, connected data storage and/or random-access memory (RAM) capacity and/or usage, number of open file descriptors (FDs), network usage metrics (send and receive operations), swap space usage, and priority of outstanding or in-progress operations (e.g., performance of background tasks vs. priority tasks), and current server temperature. Other current load metrics are contemplated herein.

In various implementations, the proactive load balancer 202 directs the current load query 246 to the storage node(s) 210 periodically (e.g., every k seconds) or in response to receiving the access request 242. The load balancer agent(s) 204 compile the received metrics into a node performance metric for each storage node. The load balancer agent(s) 204 then report the compiled node performance metric(s) 248 back to the proactive load balancer 202. In other implementations, the current load metrics for each of the servers 218 may be compiled at the proactive load balancer 202 rather than at the load balancer agent(s) 204. The node performance metrics 248 is then a collection of current load metrics for each of the servers 218 and not compiled or organized by associated storage node(s) 210 until collected by the proactive load balancer 202.

The proactive load balancer 202 routes the access request 242 to a storage node and server connected thereto using the node performance metrics 248 (e.g., the access request 242 is directed to the node/server with a low or the lowest current load) to execute the request, here illustrated as routed request 250. A variety of techniques may be used to analyze the node performance metrics 248 for routing access requests, several examples of which follow.

In a minimum threshold implementation, threshold values are defined for one or more of the collected current load metrics. If any of the threshold values are exceeded for a node/server combination, that node/server combination is rendered currently unavailable for routing access requests. More specifically, the proactive load balancer 202 receives the node performance metrics 248 for node n and server o every k seconds from the load balancer agent installed on node n. The proactive load balancer 202 analyzes the current load metrics specific to server o and determines if any threshold values within the current load metrics for node n/server o are exceeded. If so, the server o is unavailable for incoming access requests for k seconds, or until a subsequent set of node performance metrics 248 for node n and server o is received that indicates that the threshold value(s) for server o are no longer exceeded.

In a weighted average current load metric implementation, each of the received current load metrics are expressed in terms of a percentage (0-100%) and are assigned a weight (e.g., 0.1-1.0) such that they may be combined to yield a weighted composite current load score for each of the nodes and/or servers. The weighted composite current load score for each of the nodes and/or servers are then compared at the proactive load balancer 202 and generally the lowest scoring node(s) and/or server(s) are selected for executing an incoming access request.

In an example implementation, the collected current load metrics for node n and server o, include CPU usage (x), memory usage (y), and attached storage space (z). A calculated current load function for node n and server o is expressed as $L_{nt}=Ln_x*Wn_x+Ln_y*Wn_y+Ln_z*Wn_z$. $Wn_x$, $Wn_x$, and $Wn_x$ are configurable weight parameters (e.g., 0.0-1.0), in sum adding to equal 1.0, for each of metrics x, y, and z, respectively. $Ln_x$, $Ln_x$, and $Ln_x$ are instantaneous load levels for each of metrics x, y, and z, respectively. More specifically, $Ln_x$ represents load level for CPU usage at a server o, ranging from 0 to $L_H$, where $L_H$ is a high limit on the load level applied evenly across the instantaneous load levels.

$Ln_y$ represents load level for memory usage at the server o, ranging from 0 to $L_H$. $Ln_z$ represents storage space attached to the server o, ranging from 0 to $L_H$.

The selected load levels ($Ln_x$, $Ln_x$, and $Ln_x$) and weight parameters ($Wn_x$, $Wn_x$, and $Wn_x$) may vary based on a variety of conditions, including for example, node/server combinations with varying physical type and capacity and the type of the access request 242 (t). For example, attached storage space (z) may be considered a significant factor for a write request and thus is assigned a significant weight parameter for write requests. Conversely, attached storage space (z) may be considered an insignificant factor for a read request and is thus assigned a smaller weight parameter or not considered at all for read requests.

Additional access request types are contemplated herein to further optimize the data storage network 200. For example, incoming write requests may be subcategorized as small write requests (e.g., requests to write multiple files with a size less than a threshold) and large write requests (e.g., requests to write a singular file with a size greater than the threshold). The file size and type of network storage device 258 may be weighted heavily for a write request and less heavily or not at all for a read request. For example, an SSD-type network storage device 258 may be weighted favorably for small write requests. Conversely, an HDD-type network storage device 258 may be weighted favorably for large write requests as large write requests mitigate the typical speed advantage of SSDs in performing multiple small write requests.

The proactive load balancer 202 recalculates $L_n$ every k seconds for each node n and server o combination and the applicable access request type(s) t. In some implementations, calculation of $L_n$ does not vary across access request type(s) t. The proactive load balancer 202 chooses the top P nodes with the lowest current load (Ln) to execute incoming access requests (e.g., the access request 242) for each recalculated $L_n$. This creates an iterative negative feedback loop, where $L_n$ is regularly updated and the destination(s) for incoming access requests is also updated in kind. Parameters t and/or P may be fixed quantities or time-adaptive to optimize performance of the data storage network 200. Parameters t and/or P may further be selected based on the desired timing, the number of possible node/server combinations, and/or how many node/server options are desired for access at any point in time, for example. Further, thresholds for $L_n$ may be set that vary depending on the access request type (e.g., 80% or less load is required for read access requests; 75% or less load is required for write access requests; and 10% or less load is required for administrative requests).

Figure 3:
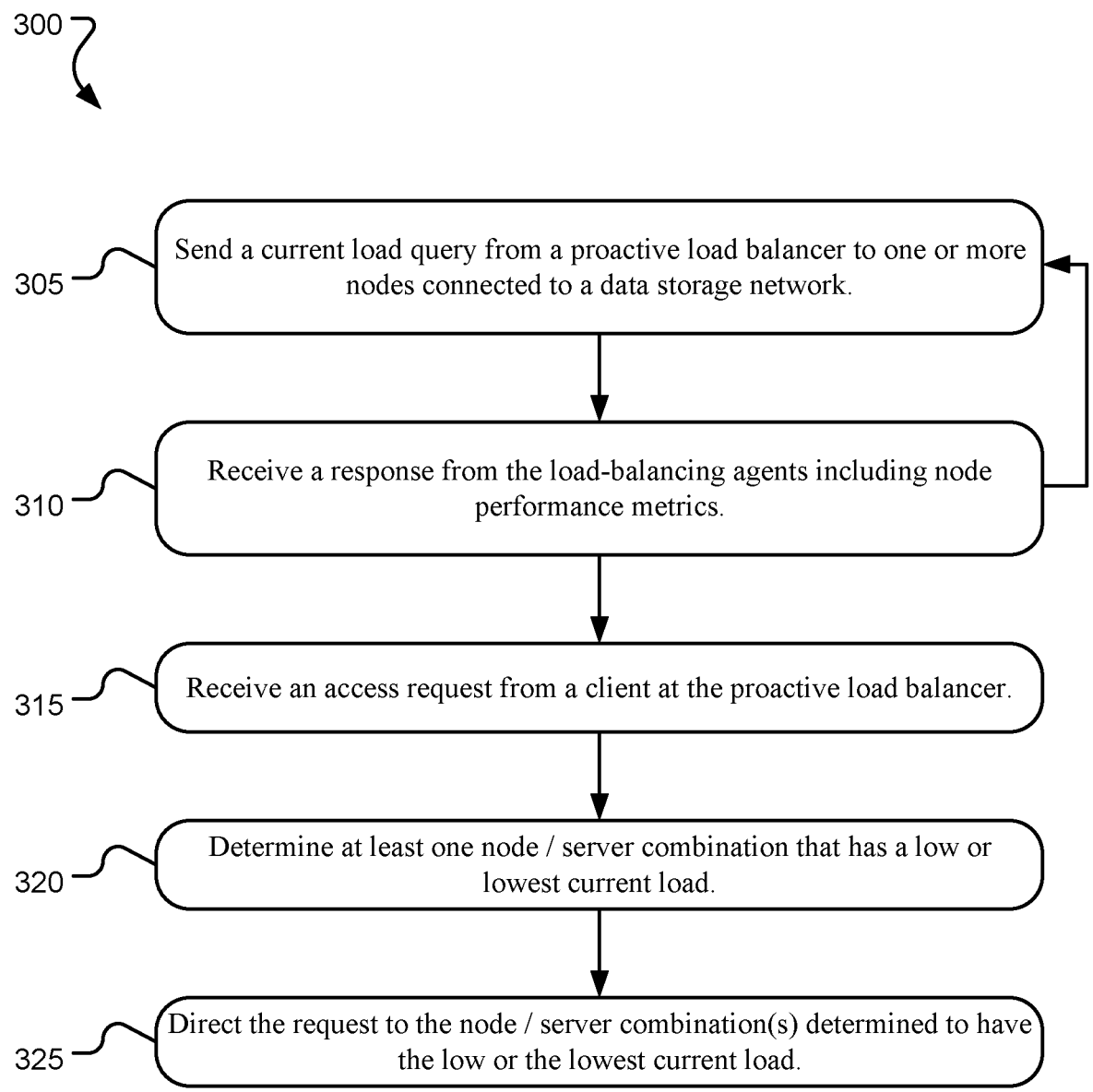
FIG. 3 illustrates example operations for operating a proactive load balancer within a data storage network.

FIG. 3 illustrates example operations 300 for operating a proactive load balancer within a data storage network. A sending operation 305 sends a current load query from the proactive load balancer to one or more nodes connected to the data storage network. Each of the nodes includes one or more servers, each connected to a data storage resource, and a load-balancing agent. The load-balancing agent(s) each collect current load metrics specific to each of the servers connected to their associated node. The current load metrics are consolidated into a node performance metric specific to each node. A first receiving operation 310 receives a response from the load-balancing agents including node performance metrics. The sending and receiving operations 305, 310 are iteratively repeated every k seconds to continually update the node performance metrics specific to each node and server.

A second receiving operation 315 receives an access request from a client at the proactive load balancer. The access request may be one of a read request, a write request, or an administrative request, for example. The proactive load balancer checks the node performance metrics and in a determining operation 320 determines at least one node/server combination that has a low or lowest current load. In a directing operation 325, the proactive load balancer directs the request to the node/server combination(s) determined to have the lowest or a low (below a threshold) current load.

Figure 4:
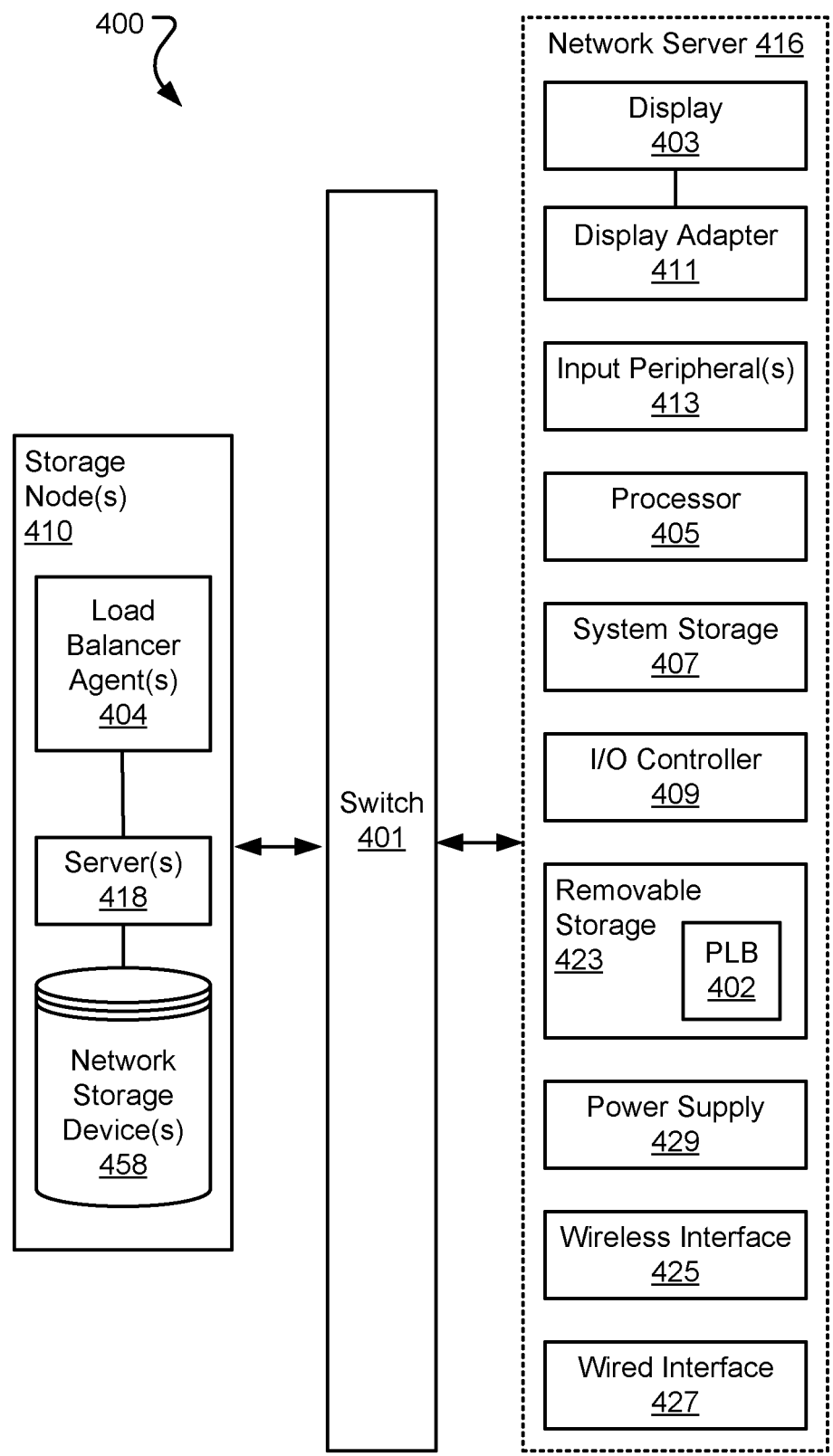
FIG. 4 illustrates an example system diagram of a computer system suitable for implementing aspects of a proactive load balancer within a data storage network.

FIG. 4 illustrates an example system diagram of a data storage network 400 (also referred to herein as a computing system 400) implementing aspects of a proactive load balancer 402. The proactive load balancer (PLB) 402 is an application (or set of applications) running on network server 416 that distributes incoming access requests across storage nodes 410 in order to optimize overall operation of the data storage network 400. Load balancer agent(s) 404 are running on the storage node(s) 410 and collect performance and/or availability information regarding server(s) 418 assigned to each respective node and report the performance and/or availability information back to the proactive load balancer 402 to inform subsequent decisions regarding distribution of subsequent incoming requests. The server(s) 418 may each have one or more connected network storage devices 458 (e.g., SSDs or HDDs).

The network server 416 manages access to storage nodes 410 via a data storage rack switch 401, which interconnects IT components within the data storage rack. In other implementations, the switch 401 is instead a wired/wireless network connection if the network server 416 and the storage nodes 410 are not contained within a common data storage rack. The network server 416 includes major subsystems such as a processor 405, system storage 407 (such as random-access memory (RAM) and read-only memory (ROM)), an input/output (I/O) controller 409, removable storage (such as a memory card) 423, a power supply 429, and external devices such as a display screen 403 via a display adapter 411, and various input peripherals 413 (e.g., a mouse, trackpad, keyboard, touchscreen, joystick, and/or smart card acceptance device). Wireless interface 425 together with a wired network interface 427, may be used to interface to the data storage rack, the data storage network 400, and/or a local or wide area network (such as the Internet) using any network interface system known to those skilled in the art.

Many other devices or subsystems (not shown) may be connected in a similar manner (e.g., servers, personal computers, tablet computers, smart phones, mobile devices, etc.). Also, it is not necessary for all of the components depicted in FIG. 4 to be present to practice the presently disclosed technology. Furthermore, devices and components thereof may be interconnected in different ways from that shown in FIG. 4. Code (e.g., computer software, including mobile applications (apps) to implement the presently disclosed technology may be operably disposed in the network storage devices 458, the system storage 407, and/or the removable storage 423.

The computing system 400 may include a variety of tangible computer-readable storage media (e.g., the network storage devices 458, the system storage 407, and/or the removable storage 423) and intangible computer-readable communication signals. Tangible computer-readable storage can be embodied by any available media that can be accessed by the computing system 400 and includes both volatile and non-volatile storage media, as well as removable and non-removable storage media implemented in any method or technology for storage of information such as computer readable instructions, data structures, program modules, and/or other data. Tangible computer-readable storage media includes, but is not limited to, firmware, RAM, ROM, electrically erasable programmable read-only memory (EEPROM), flash memory or other memory technology, optical disc storage, magnetic cassettes, magnetic tape, magnetic disc storage or other magnetic storage devices, or any other tangible medium which can be used to store the desired information, and which can be accessed by the computing system 400.

Intangible computer-readable communication signals may embody computer readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, radio frequency (RF), infrared (IR), and other wireless media. Computer-readable storage media as defined herein specifically excludes intangible computer-readable communications signals.

Some implementations may comprise an article of manufacture which may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, operation segments, methods, procedures, software interfaces, application program interfaces (APIs), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described implementations. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain operation segment. The instructions may be implemented using any suitable high-level, low-level, object-oriented, visual, compiled and/or interpreted programming language.

The presently disclosed technology may be implemented as logical steps in one or more computer systems (e.g., as a sequence of processor-implemented steps executing in one or more computer systems and as interconnected machine or circuit modules within one or more computer systems). The implementation is a matter of choice, dependent on the performance requirements of the computer system implementing the presently disclosed technology. Accordingly, the logical operations making up implementations of the presently disclosed technology are referred to variously as operations, steps, objects, or modules. Furthermore, it should be understood that logical operations may be performed in any order, adding or replacing operations as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A data storage system comprising:
   a first node including:
      one or more servers, each connected to a data storage resource; and
      a first load-balancing agent;
   a second node including:
      one or more servers, each connected to a data storage resource; and
      a second load-balancing agent; and
   a proactive load balancer to receive a first node performance metric from the first load-balancing agent and a second node performance metric from the second load-balancing agent, the proactive load balancer further to direct an incoming access request to the data storage system to a specific one or more of the servers connected to the first node and the second node based on the first node performance metric and the second node performance metric, wherein the first node performance metric includes one or more current load metrics specific to each of the servers connected to the first node and the second node performance metric includes one or more current load metrics specific to each of the servers connected to the second node.

2. The data storage system of claim 1, wherein a set of current load metrics include one or more performance characteristics of a server.

3. The data storage system of claim 1, wherein a weighted average function is applied to a set of the current load metrics to yield a calculated current load on a server.

4. The data storage system of claim 3, wherein different weight parameters are used in the weighted average function to generate different calculated current loads for read requests, write requests, and administrative requests.

5. The data storage system of claim 3, wherein the proactive load balancer is further to direct the incoming access request to a server having a lowest calculated current load.

6. The data storage system of claim 1, wherein the incoming access request is one of a read request, a write request, and an administrative request.

7. The data storage system of claim 1, wherein the current load metrics include one or more of central processing unit usage, memory usage, storage access bandwidth, process load specific to a server.

8. The data storage system of claim 1, wherein the first node performance metric includes overall load on the first node and the second node performance metric includes overall load on the second node.

9. The data storage system of claim 1, wherein the proactive load balancer is to receive the first node performance metric from the first load-balancing agent and the second node performance metric from the second load-balancing agent on a periodically repeating basis.

10. The data storage system of claim 1, wherein the proactive load balancer is to receive the first node performance metric from the first load-balancing agent and the second node performance metric from the second load-balancing agent prior to each subsequent access request incoming to the data storage system.

11. A method of operating a proactive load balancer within a data storage network comprising:
sending a current load query from the proactive load balancer to:
a first node including:
one or more servers, each connected to a data storage resource; and
a first load-balancing agent;
a second node including:
one or more servers, each connected to a data storage resource; and
a second load-balancing agent;
receiving a response from the first load-balancing agent including a first node performance metric and from the second load-balancing agent including a second node performance metric;
receiving an access request from a client at the proactive load balancer for the data storage network; and
directing the access request to a specific one or more of the servers connected to the first node and the second node based on the received first node performance metric and the second node performance metric, wherein the first node performance metric includes one or more current load metrics specific to each of the servers connected to the first node and the second node performance metric includes one or more current load metrics specific to each of the servers connected to the second node.

12. The method of claim 11, wherein a set of current load metrics include one or more performance characteristics of a server.

13. The method of claim 11, wherein a weighted average function is applied to a set of the current load metrics to yield a calculated current load on a server.

14. The method of claim 13, wherein different weight parameters are used in the weighted average function to generate different calculated current loads for read requests, write requests, and administrative requests.

15. One or more computer-readable storage media encoding computer-executable instructions for executing on a computer system a computer process for operating a proactive load balancer within a data storage network, the computer process comprising:
sending a current load query from the proactive load balancer to:
a first node including:
one or more servers, each connected to a data storage resource; and
a first load-balancing agent;
a second node including:
one or more servers, each connected to a data storage resource; and
a second load-balancing agent;
receiving a response from the first load-balancing agent including a first node performance metric and from the second load-balancing agent including a second node performance metric;
receiving an access request from a client at the proactive load balancer for the data storage network; and
directing the access request to a specific one or more of the servers connected to the first node and the second node based on the received first node performance metric and the second node performance metric, wherein the first node performance metric includes one or more current load metrics specific to each of the servers connected to the first node and the second node performance metric includes one or more current load metrics specific to each of the servers connected to the second node.

16. The computer-readable storage media of claim 15, wherein a set of current load metrics include one or more performance characteristics of a server.

17. The computer-readable storage media of claim 15, wherein a weighted average function is applied to a set of the current load metrics to yield a calculated current load on a server.

* * * * *